(12) United States Patent
Pfister et al.

(10) Patent No.: US 11,436,111 B2
(45) Date of Patent: Sep. 6, 2022

(54) HIGHLY-AVAILABLE DISTRIBUTED NETWORK ADDRESS TRANSLATION (NAT) ARCHITECTURE WITH FAILOVER SOLUTIONS

(71) Applicant: Cisco Technology, Inc., San Jose, CA (US)

(72) Inventors: Pierre Pfister, Chalons-en-Champagne (FR); Ian James Wells, San Jose, CA (US); Kyle Andrew Donald Mestery, Woodbury, MN (US); William Mark Townsley, San Francisco, CA (US); Yoann Desmouceaux, Paris (FR); Guillaume Ruty, Paris (FR); Aloys Augustin, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 16/592,613

(22) Filed: Oct. 3, 2019

(65) Prior Publication Data
US 2021/0103507 A1 Apr. 8, 2021

(51) Int. Cl.
*G06F 11/20* (2006.01)
*G06F 9/455* (2018.01)
(Continued)

(52) U.S. Cl.
CPC ...... *G06F 11/2033* (2013.01); *G06F 9/45558* (2013.01); *H04L 61/2503* (2013.01);
(Continued)

(58) Field of Classification Search
CPC ....... G06F 2009/45595; G06F 2201/85; G06F 9/45558; G06F 11/2033; H04L 61/2503; H04L 61/6009
(Continued)

(56) References Cited

U.S. PATENT DOCUMENTS 7,107,360 B1 * 9/2006 Phadnis ............ H04L 29/12367
709/239
7,280,557 B1 * 10/2007 Biswas ............ H04L 29/12367
370/465

(Continued)

OTHER PUBLICATIONS

Chesire et al., Network Address Translation Port Mapping Protocol (NAT-PMP), Apr. 2008, available at http://files.dns-sd.org/draft-nat-port-mapping.txt (last visited Jan. 5, 2022) (Year: 2008).*

(Continued)

*Primary Examiner* — David P Zarka
(74) *Attorney, Agent, or Firm* — Lee & Hayes, P.C.

(57) ABSTRACT

This disclosure describes techniques for providing a distributed scalable architecture for Network Address Translation (NAT) systems with high availability and mitigations for flow breakage during failover events. The NAT servers may include functionality to serve as fast-path servers and/or slow-path servers. A fast-path server may include a NAT worker that includes a cache of NAT mappings to perform stateful network address translation and to forward packets with minimal latency. A slow-path server may include a mapping server that creates new NAT mappings, depreciates old ones, and answers NAT worker state requests. The NAT system may use virtual mapping servers (VMSs) running on primary physical servers with state duplicated VMSs on different physical failover servers. Additionally, the NAT servers may implement failover solutions for dynamically allocated routable address/port pairs assigned to new sessions by assigning new outbound address/port pairs when a session starts and broadcasting pairing information.

16 Claims, 6 Drawing Sheets

(51) Int. Cl.
*H04L 61/2503* (2022.01)
*H04L 61/58* (2022.01)

(52) U.S. Cl.
CPC ............ *G06F 2009/45595* (2013.01); *G06F 2201/85* (2013.01); *H04L 61/6009* (2013.01)

(58) Field of Classification Search
USPC ........................................... 714/4.11
See application file for complete search history.

(56) References Cited

U.S. PATENT DOCUMENTS

| | | | | |
|---|---|---|---|---|
| 8,064,451 | B2 * | 11/2011 | Cheriton | H04L 29/1233 370/392 |
| 8,422,391 | B2 * | 4/2013 | Zhu | H04L 61/2582 370/252 |
| 8,934,489 | B2 * | 1/2015 | Yu | H04L 61/2557 370/392 |
| 9,042,381 | B2 * | 5/2015 | Jayasenan | H04L 29/12009 370/389 |
| 9,148,402 | B2 * | 9/2015 | Pratapa | H04L 61/2517 |
| 9,622,143 | B1 * | 4/2017 | Sankaran | H04L 12/4604 |
| 10,938,923 | B2 * | 3/2021 | Yeddula | H04L 45/306 |
| 11,095,710 | B2 * | 8/2021 | Deen | H04L 43/0876 |
| 2016/0226815 | A1 * | 8/2016 | Wan | H04L 61/2521 |
| 2019/0261263 | A1 * | 8/2019 | Tu | H04L 47/193 |
| 2020/0228619 | A1 * | 7/2020 | Zhang | H04L 69/22 |

OTHER PUBLICATIONS

Desmouceaux et al., 6LB: Scalable and Application-Aware Load Balancing with Segment Routing, IEEE/ACM Transactions on Networking, vol. 26, No. 2, pp. 819-834, Apr. 2018 (Year: 2018).*

Desmouceaux et al., A Content-aware Data-plane for Efficient and Scalable Video Delivery, 2019 IFIP/IEEE International Symposium on Integrated Network Management, pp. 10-18, Apr. 2019 (Year: 2019).*

Claudel et al., Stateless Load-Aware Load Balancing in P4, 2018 IEEE 26th International Conference on Network Protocols, pp. 418-423, Sep. 2018 (Year: 2018).*

"Cloud NAT", available at least as early as Feb. 14, 2019, accessed Oct. 3, 2019 at <21 https://cloud.google.com/nat/docs/overview>>, 2019, 21 pages.

* cited by examiner

HIGHLY-AVAILABLE DISTRIBUTED NETWORK ADDRESS TRANSLATION (NAT) ARCHITECTURE WITH FAILOVER SOLUTIONS

TECHNICAL FIELD

The present disclosure relates generally to providing a scalable architecture for distributed Network Address Translation (NAT) systems with high availability and quick mitigations during failover events.

BACKGROUND

An Internet Protocol (IP) address is a numerical label assigned to each device connected to a network that uses the Internet Protocol for communication. Network Address Translation (NAT) is a method of remapping one IP address into another by modifying network address information in the IP header of packets while they are in transit across a routing device. Due to Internet Protocol version 4 (IPv4) address exhaustion, NAT implementations have become an essential tool in conserving global address space. One Internet-routable IP address of a NAT gateway can be used for an entire private network.

Hardware-based solutions for NAT implementations was previously economically viable and capable of supporting high throughput, as well as able to provide high-availability using Virtual Router Redundancy Protocol (VRRP) and per-flow state replication between a primary router and a secondary hot-spare. But recent trends in Cloud networking and data-center architectures combined with the IPv4 address exhaustion, have created a need for large NATs with even greater throughput, capable of handling more traffic flow in parallel, beyond the capabilities of single application-specific integrated circuits (ASICs).

One commonly used solution to this scalability problem consists of load-balancing traffic between multiple NAT appliances, but this solution needs additional layers of load-balancing routers. The recent trends lead to hardware-based solutions, which may be simpler as long as a single appliance was sufficient, being replaced by software-based solutions with software-based appliances running in parallel on off-the-shelf servers.

Due to improvements in central processing unit (CPU) input/output, individual off-the-shelf servers are now able to forward up to 1 Tbps of data. These servers also have a larger memory size, allowing for larger flow tables, with greater time-out values. However, switching from hardware-based solutions to software-based solutions (i.e., from ASICs to commodity CPUs) requires a larger number of instances to run in parallel, as well as requires a better capability to handle failures. Accordingly, it may be advantageous to leverage both hardware and software capabilities to provide large NAT systems with higher scalability and availability with mitigations during failovers.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
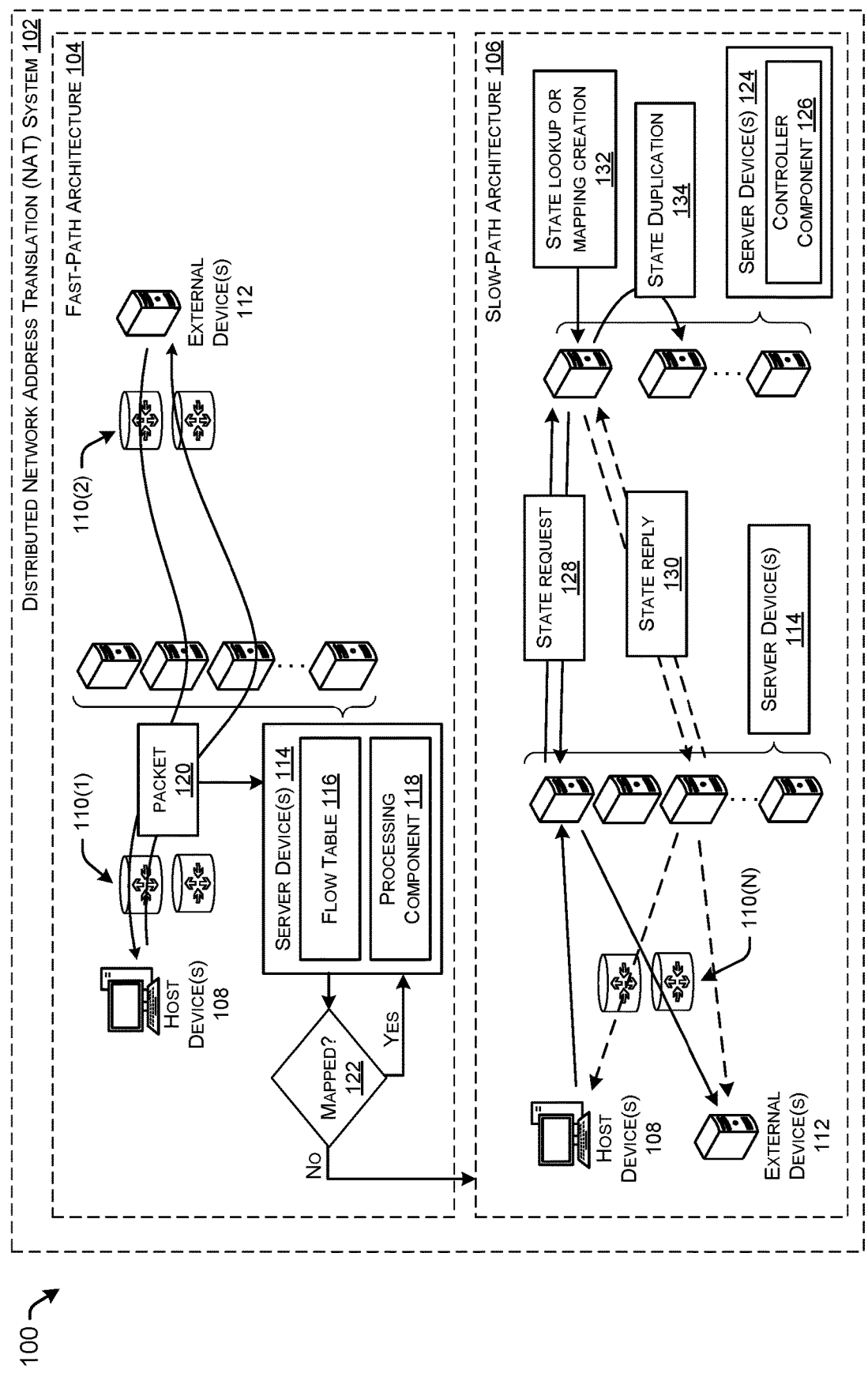
FIG. 1 illustrates a system-architecture diagram of an example environment in which a distributed network address translation (NAT) system uses fast-path and slow-path architecture on which the distributed NAT is running.

This disclosure describes techniques for providing a scalable architecture for distributed Network Address Translation (NAT) systems with high availability and mitigations for flow breakage during failover events. The method includes distributed NAT servers that include functionality to serve as fast-path and/or slow-path servers. The fast-path servers, also referred herein as NAT workers, handles the data plane tasks and flow tables. A NAT worker may have a cache of NAT mappings to perform stateful network address translations (SNAT) and to forward packets with minimal latency. SNAT allows two or more network address translators to function as a translation group. One member of the translation group handles traffic requiring translation of IP address information. Additionally, it informs the "failover" backup translator of active flow as they occur. The "failover" backup translator can then use information from the active "primary" translator to prepare duplicate translation table entries by "state duplication." Therefore, if the active "primary" translator is hindered by a critical failure, the traffic can rapidly be switched to the "failover" backup. The traffic flow continues since the same network address translations are used and the state of those translations has been previously defined.

The slow-path servers, also referred herein as mapping servers, handles the mappings between internal and external addresses and ports. The mapping servers perform state lookups on larger flow tables, create new mappings, depreciate old mappings, and answer state requests from NAT workers when the worker does not have the mapping in cache for a current packet.

Additionally, the method implements load-balancing and high availability by using Virtual Mapping Server (VMS). Each VMS is associated with one primary physical server and at least one different failover physical server. Further, the method includes a failover solution for dynamic NAT by generating and assigning an outbound address/port to new IP sessions and sharing the generated information with other servers.

Additionally, the techniques described herein may be performed by a system and/or device having non-transitory computer-readable media storing computer-executable instructions that, when executed by one or more processors, performs the method described above.

Example Embodiments

The usefulness of Network Address Translation (NAT) systems, from the popularity of cloud networking and datacenter to the IPv4 public addresses shortage, has resulted in greater need for large NATs with greater throughput and capability of handling more traffic flow in parallel. Using NAT technologies, a single publicly exposed IP address can be NAT mapped to multiple private hosts. Additionally, using virtualization technologies, a single physical server can host multiple NAT mapping servers, operating systems, and/or data storage instances using server virtualization. In this way, multiple NAT processes may execute on a single physical server to increase overall hardware utilization of that physical server. Some distributed NAT systems may utilize software clustering where multiple physical servers are turned into a cluster of physical servers, or a group of servers, that act like a single system. Each of the servers in the physical cluster collectively run, to function as a translation group, or support the same NAT system, referred to herein as a distributed NAT. For example, virtual machines (VMs) and/or virtual mapping servers (VMS) may run processes of IP address translation to provide a distributed NAT. Additionally, a routing device using virtual routing and forwarding (VRF) instances may allow multiple instances of a routing table to exist in a single routing device and work simultaneously. A distributed NAT that runs on a cluster of physical servers provide various advantages, such as increased availability, increased scalability, and failover protections.

In some examples, a distributed NAT system may use fast-path and/or slow-path servers to leverage both hardware and software solutions to optimize packets processing and/or forwarding. Although fast-path servers and slow-path servers are described separately, a single physical server may include and perform functionality for both. The packets may be received from routers using equal-cost multi-path routing (ECMP), or any other load-balancing technique and/or hashing algorithm, without assumptions made on the algorithm used by the routers. In particular, the presently disclosed NAT system is able to cope with ECMP re-hash efficiently.

The fast-path servers may include NAT workers that perform data-plane tasks using small flow tables including cache of NAT mappings. The mappings that are present in those cache may have shortened lifetimes, as deprecating an entry will not cause the session to be lost (the session can still be recovered from slow-path). The cache allows the NAT workers to perform network address translation and forward packets with minimal latency. Accordingly, the NAT workers can be optimized for high performance (small tables, high throughput), and can be implemented in application-specific integrated circuits (ASICs), thus leaving slow-path logic to servers and/or CPUs. In various examples, the NAT workers may forward packets to mapping servers based on dispatch direction. From inside to outside dispatch, it is hash-based, while from outside to inside, it is by finding the mapping server owning the destination address and port.

In some examples, the fast-path NAT servers may use dynamically allocated routable address/port pairs assigned to new sessions. The routable addresses are mapped to unrouteable addresses and the NAT worker translates, in both directions, one to the other. However, the dynamic nature of this kind of NAT means that the external port and address used for a session cannot be predicted from a second location. This is problematic for redundancy due to the inability to failover a session from one place to another without this information in the second location. To mitigate this problem, when a session starts, the system may assign an outbound address/port and share with one or more other servers. In the event that there is a failure of any type and traffic must be forwarded to the one or more other servers, the outbound information is on hand and available.

The slow-path servers may perform mappings between internal and external addresses and ports and may be included in a cluster of "mapping servers." The slow-path is called "slow" because it uses larger flow tables and handles the process of creating new mappings. These servers may oversee creating new NAT mappings, deprecating old NAT mappings, and answering NAT workers requests when the workers do not know the mapping for a particular NAT state.

In the present distributed NAT system, consistent load-balancing and high availability features are implemented by Virtual Mapping Servers (VMSs). The number of VMSs is set by configuration and should be greater than the number of physical servers. Each VMS is assigned a pool of public addresses and ports automatically by the control-plane. At any point in time, each VMS is associated with one physical primary server, and at least one different physical failover server. In this way, each physical mapping servers are used as primary and failover servers at the same time without needing to use "hot-spare" servers. A particular physical server can be used as primary for multiple virtual mapping servers while the VMS image may be copied to different failover servers. Thus, in case of a failure, the failover traffic will flow into multiple failover servers instead of a single one. Accordingly, the VMSs not die unless there are more than 2 failures. However, the present NAT system can be made more robust by adding multiple failover servers per virtual mapping servers.

Although the techniques described herein are primarily with reference to stateful NATs, the techniques are generally applicable to any per-flow resource allocation and/or IP address translation techniques, including max-min fairness allocation, proportional fairness allocation, dynamic NAT, static NAT, carrier grade NAT, source NAT, port address translation, etc. Further, while the techniques are described with reference to virtual mapping servers, the techniques are equally application to any distributed NAT that is deployed on top of a cluster of physical servers.

The techniques described herein provide various improvements and efficiencies with respect to distributed NATs. For example, the techniques described herein may reduce the amount of time, or latency, for distributed NATs to process packets and/or respond to requests by using the fast-path and slow-path architecture to optimize communication routes. The system implements Virtual Mapping Servers (VMSs) to provide high availability such that a server failure will not cause the loss of sessions. By implementing primary and failover VMSs, high availability does not require twice as many servers, instead, accounting for any N random failures will only require over-provisioning by N servers. Moreover, the system does not require a load-balancer, rather the control-plane maps VMSs to physical servers based on calculations made for fair load sharing, thus avoiding the additional delay, architecture and deployment complexity as well as possible failure points introduced by load-balancers. By providing mitigation solutions for both fast-path and slow-path, the system is able to react very quickly to failures, providing minimal packet loss, and is able to handle multiple failures without losing any state.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a distributed network address translation (NAT) system uses fast-path and slow-path architecture on which the distributed NAT is running.

In some examples, the distributed NAT system 102 may utilize fast-path architecture 104 and slow-path architecture 106 to optimize performing network address translations. The distributed NAT system 102 may comprise an array of server device(s) 114, server device(s) 124, and routing device 110(1)-110(N) where N is any integer greater than "1." The server device(s) 114, 124 and routing devices 110 may be in stored in data centers located across geographic areas. The distributed NAT system 102 may be a distributed network through which a user may interact via a private host device(s) 108 to instantiate, support, run, and/or execute IP communication sessions with a public external device(s) 112. The host device(s) 108 can communicate with the external device(s) 112 via one or more network through one or more routing devices 110 and one or more server device(s) 114, 124. The outbound and return path may go through the same or different devices.

The distributed NAT system 102 may provide on-demand availability of computing system resources, such as data storage, computing power (e.g., CPU, GPU, etc.), networking, databases, etc., without direct active management by users. In some examples, the distributed NAT system 102 may be managed and maintained by a service provider such that users do not have to invest in and maintain the computing infrastructure for their computing resource needs. The portions of the distributed NAT system 102 may be allocated using hardware virtualization such that portions of the distributed NAT system 102 can be configured and managed by the user (e.g., security configuration, load balancing configuration, etc.). However, the distributed NAT system 102 need not be managed by a service provider, and can be managed by any entity, including the user themselves that run or use the services.

In some examples, an admin user of the distributed NAT system 102 may request that multiple server device(s) 114, 124 in the distributed NAT system 102 be grouped into a physical cluster where each server device(s) 114, 124 is a cluster node. As discussed herein, the functionality for both NAT servers and mapping servers (e.g., server device(s) 114, 124) may be included in the same or different devices. Accordingly, the admin user may group a cluster of server device(s) 114 to serve as distributed NAT servers and a cluster of server device(s) 124 to serve as distributed mapping servers. Additionally, and/or alternatively, the admin user may group a cluster of server device(s) 114, 124 to serve as distributed NAT and mapping servers. Generally, a physical cluster may refer to a group of servers (e.g., server device(s) 114, 124) working together in a system or network to provide, among other benefits, higher availability of services. Each node in the physical cluster may run or execute one or more virtual resources, such as virtual mapping servers (VMSs), virtual machines, etc., that run an application, service, process, or the like. By duplicating any created VMS as a primary VMS on a first physical server and a failover VMS on different second physical server, the physical cluster can reduce downtime and outages by allowing another server device(s) 114, 124 to take over in the event of an outage. For instance, if one of these server device(s) 114, 124 experiences a service outage, the workload on that server device(s) 114, 124 may be redistributed to another server device(s) 114, 124 before any downtime is experienced by the client. In this way, the physical cluster may support services with a higher level of availability, reliability, and scalability than a single server device 114 and 124 offers.

In additional examples, the distributed NAT system 102 may function as a stateful network address translation (SNAT) system that allows two or more mapping servers to function as a translation group. One member of the translation group handles traffic requiring translation of IP address information. Additionally, it informs the "failover" backup mapping server of active flow as they occur. The "failover" backup mapping server can then use information from the active "primary" mapping server to prepare duplicate translation table entries by "state duplication." Therefore, if the active "primary" mapping server is hindered by a critical failure of the physical server, the traffic can rapidly be switched to the "failover" backup mapping server. The traffic flow continues since the same network address translations are used and the state of those translations has been previously defined.

In additional examples, the admin user of the distributed NAT system 102 may add a new physical server to the mapping server cluster and trigger state synchronization across the servers by remapping existing primary or failover VMSs to the new server. As described in more detail in FIGS. 2 and 3, the control-plane may remap virtual mapping servers (VMSs), based on server failure or new server addition, to physical servers to ensure fair load sharing.

In some examples, the distributed NAT system 102 may include the fast-path architecture 104 and the slow-path architecture 106 to process packets. Although the fast-path architecture 104 and the slow-path architecture 106 are illustrated as two different sets of devices for clarity, components for a fast-path server and a slow-path server may be implemented on the same servers (e.g., server device(s) 114, 124). As presented visually in FIG. 1, the fast-path architecture 104 and the slow-path architecture 106 are separated to illustrate how an incoming packet may be processed by either the fast-path or slow-path internally. For instance, an incoming packet may have a local NAT state (e.g., has mapping in cache) and may take the fast-path, while an incoming packet that does not have a local NAT state (e.g., needs mapping creation) may take the slow-path. The distributed NAT system 102 may process outbound IP packets from a private network and inbound/returning IP packets from a public network. The IP packets may include one or more of a source IP address, a destination IP address, and a port. The IP packets (e.g., packet 120) passing from the private network to the public network (e.g., from host device(s) 108 to external device(s) 112) may have their source address modified. For instance, traffic received from inside the network may be associated with a virtual mapping server by hashing the source address. The IP packets passing from the public network back to the private network (e.g., from external device(s) 112 to host device(s) 108) may have their destination address modified. For instance, traffic received from outside the network may be associated with a virtual mapping server by combining the destination address with the mapping pool address associated with the virtual mapping server.

In various examples, the fast-path architecture 104 may illustrate the fast-path process for the packet 120 received from the host device(s) 108. The packet 120 may be routed through routing device 110(1) to the server device(s) 114. In some examples, the server device(s) 114 may include functionality to serve as network address translation servers. The NAT servers may include NAT workers to perform data-plane tasks including table lookup, packet forwarding, and sending state requests. In various examples, the server device(s) 114 may include the flow table 116 and processing component 118. The server device(s) 114 may determine, based on a table lookup on the flow table 116, if the packet 120 could be forwarded with minimal latency. If the mapping is found, the processing component 118 may perform the state network address translation and forward the packet according to the translation. Although, the routing device 110(1) and routing device 110(2) are illustrated in FIG. 1 as separate devices for clarity, the two routing devices 110 can be included on the same device with different virtual routing and forwarding (VRF) instances. VRF technology allows multiple instances of a routing table to exist in a single routing device 110 and work simultaneously.

The host device(s) 108 may include any private host devices connected to the internal network. Examples of the host device(s) 108 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the host device(s) 108 include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

The routing device 110 may include any router or network gateway device implemented as one or more routing device to facilitate communications by and between the various devices in the environment 100. The packets may be received from routing device 110 using equal-cost multi-path routing (ECMP), or any other load-balancing technique and/or hashing algorithm, without assumptions made on the algorithm used by the routing device 110. In particular, the presently disclosed NAT system is able to cope with ECMP re-hash efficiently. The routing device 110 may use Bidirectional Forwarding Detection (BFD) protocol to detect failures. BFD is a detection protocol designed to provide fast forwarding path failure detection times for all media types, encapsulations, topologies, and routing protocols.

The external device(s) 112 may include any device on the public network that the host device(s) 108 is communicating with. Examples of the external device(s) 112 can include, but are not limited to, servers, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network.

The server device(s) 114 may include a flow table 116 and a processing component 118. As described herein, the fast-path servers may include the server device(s) 114 with functionality to serve as NAT workers that are optimized for high performance (small tables, high throughput), and can be implemented in application-specific integrated circuits (ASICs), thus leaving slow-path logic to CPU and/or mapping servers.

The flow table 116 may include a cache of NAT mappings for IP address remapping to forward packets with minimal latency. In some examples, the flow table 116 may keep track of active flow as they occur and may include a state table that keeps track of the state of the connection locally. The state table may keep track of the details of the connection, like ports, packet order, and the IP addresses involved. The flow table 116 may store the rules populated by the mapping servers when sending state responses for controlling and directing the packet flows in the network. The cache of NAT mappings that are present in the flow table 116 may have small lifetimes, as deprecating an entry will not cause the communication session to be lost. Such session may still be recovered from the slow-path, as discussed herein.

The processing component 118 may process and forward packets. Based on the rules stored in the flow table 116, the processing component 118 may process the packet according to the rules and determine where to direct the packet. The processing component 118 may forward packets to another component of the server device(s) 114, the server device(s) 124, or the routing devices 110.

As a non-limiting example, a user may interact via the host device(s) 108 to maintain active connection with the external device(s) 112 by passing packet 120. The distributed NAT system 102 may determine that the packet 120 requires minimal processing and should be forwarded by the fast-path based on examining the IP address. For instance, the server device(s) 114 may include the flow table 116 and a cache of NAT mappings to determine whether it has sufficient information to control and direct the packet 120 in the network. In the present example, the packet 120 is mapped in the flow table 116 and thus a processing component 118 can process and forward the packet 120 with minimal latency. However, if the flow table 116 does not have sufficient information to control and direct the packet 120 (e.g., no mapping found on any table entry), the packet 120 may require additional processing thus takes the slow-path.

The slow-path architecture 106 may handle packets that requires additional processing from the fast-path. In some examples, the slow-path architecture 106 may include NAT workers (e.g., server device(s) 114) sending state requests to mapping servers (e.g., server device(s) 124). The NAT worker may determine based on its flow table 116 that it does not have a matching NAT state entry for the packet and may send a state request with or without the packet (e.g., state request 128) to a mapping server. Determining whether the state request may or may not contain the packet is based on the NAT worker's capability to keep packets in cache and the network's capability to handle traffic between slow-path and fast-path. In some examples, the state request packet may include requests for multiple flows.

The server device(s) 124 may include a controller component 126. The controller component 126 may control the different servers, perform health checking functions on the servers, and generate mapping tables. In some examples, the controller component 126 may control and direct the packet flow within the network. The controller component 126 may determine to perform a state lookup on a larger flow table and/or create a new NAT mapping 132.

In various examples, the distributed NAT system 102 may use the controller component 126 to create Virtual Mapping Servers (VMSs) to enable high availability features that provides continued service in the event of physical server failures. The VMSs are added and removed as public address space is added and removed. The controller component 126 may create a VMS, associate the new VMS with a set of public addresses and ports, and associate the new VMS with a first physical primary server and backup the VMS on a second physical failover server. The controller component 126 may associate the VMS with physical servers based on a fair load sharing scheme. In various examples, the controller component 126 may inform the backup VMS of active flows as they occur. The "failover" backup VMS can then use information from the active "primary" VMS to prepare duplicate translation table entries by "state duplication." In some examples, the controller component 126 may be informed of a server failure by the NAT worker through the state request and the controller component 126 may perform a table re-computation. The VMSs stored on failed primary servers are replaced with their backup VMSs on failover servers. Failed failover servers are replaced with new failovers. The new mapping table is pushed to all NAT workers and mapping servers. When necessary, the controller component 126 may start a full table synchronization process.

In examples, the NAT worker receiving a packet may locally cache the packet and may or may not send the packet with a state-request to the mapping server. If the packet is not sent with the state-request, the meta-data associated with the packet may be sent with the request. This allows the NAT worker to forward the cached packet even if it is not returned with the state-reply. The server device(s) 114 may dynamically determine to cache and/or forward packets with in state-request based on the available space to cache packets. In various examples, based on the current load, the network and server capabilities, the packet may be: (1) kept in cache with the NAT worker while the meta-data associated with the packet is sent to the mapping server, and forwarded when the state reply (e.g., state reply 130) is received by the NAT worker; (2) sent alongside the request to the mapping server and received alongside the reply back by the NAT worker; (3) sent alongside the request to the mapping server, NATed, and forwarded by the mapping server, which will only return the state reply without the packet to the NAT worker; (4) dropped, where the state request is sent, but the packet is lost by the NAT worker.

In additional examples, the mapping server may receive the state request and determine whether to perform a state lookup on a larger flow table and/or create a new NAT mapping 132 for the packet. The larger flow table may include the flow table 116 and additional flow tables from additional node servers in the cluster. The larger flow table may include the flow table 116 and additional flow tables from additional node servers in the cluster. If the mapping server determines to create a new virtual mapping server (VMS) based on the state request 128, the controller (e.g., controller component 126) may determine which physical servers to associate the VMS with as the primary server and failover server. The controller may duplicate the VMS from the primary server to the failover server. The mapping server may send a state reply back to the NAT worker, in response to the state request. In some examples, the state reply packet may include replies for multiple flows.

As a non-limiting example, a user of the distributed NAT system 102 may interact via the host device(s) 108 to initiate and maintain active communication sessions with the external device(s) 112 by passing packet 120. The distributed NAT system 102 may determine to process the packet by slow-path based on examining the packet. The server device 114 may transmit a state request 128 with the packet 120 alongside to the server device 124. The controller component 126 may determine to process and forward the packet 120 in the network. The controller component 126 may determine perform state duplication 134 for any associated VMS's. The server device(s) 124 may transmit the state reply 130 back to the server device(s) 114.

Figure 2:
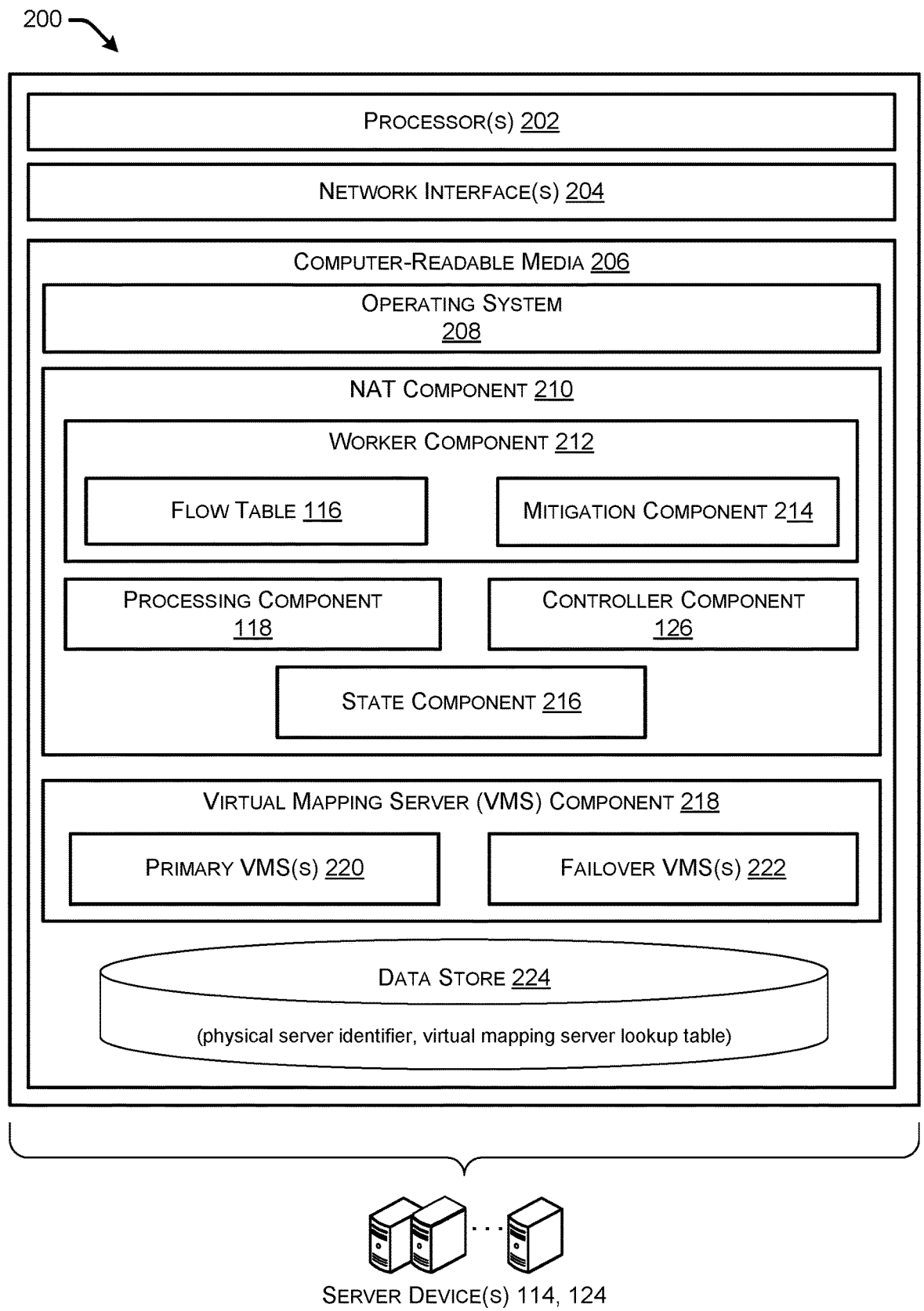
FIG. 2 is a block diagram of an illustrative computing architecture for implementing a server device that can be utilized to implement aspects of the various technologies presented herein.

FIG. 2 is a block diagram of an illustrative computing architecture 200 for implementing a server device(s) 114, 124 that can be utilized to implement aspects of the various technologies presented herein. The computing architecture 200 may be implemented in a distributed or non-distributed computing environment.

The computing architecture 200 may include one or more processor(s) 202, one or more network interfaces 204, and one or more computer-readable media 206 that stores various modules, data structures, applications, programs, or other data. As illustrated, the computing architecture 200 may include one or more hardware processors 202 (processors) configured to execute one or more stored instructions. The processor(s) 202 may comprise one or more cores. Further, the computing architecture 200 may include one or more network interfaces 204 configured to provide communications between the server device(s) 114, 124 and other devices, such as the external device(s) 112, and communications between devices in the distributed NAT system 102 (e.g., host device(s) 108, routing device(s) 110, load balancers, etc.). The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth. The computer-readable media 206 may include instructions that, when executed by the one or more processor(s) 202, cause the processors to perform the operations described herein for the distributed NAT system 102.

The computer-readable media 206 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments, the computer-readable media 206 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

The computing architecture 200 may include computer-readable media 206 that stores one or more operating systems 208. The operating system(s) 208 may generally support basic functions of the server device(s) 114, 124 in the distributed NAT system 102, such as scheduling tasks on the devices, executing applications on the devices, controlling peripheral devices, and so forth. In some embodiments, the computer-readable media 206 may further store the NAT component 210 and associated components, the virtual server component 218 and associated components, and the data store 224, which are described in turn. The components may be stored together or in a distributed arrangement.

The NAT component 210 may include the worker component 212 and associated components, the processing component 118, the controller component 126, and the state component 216. In some examples, the server device(s) 114, 124 may include all or some components of the NAT component 210. For instance, a NAT worker may implement the worker component 212 but not the controller component 126. In additional examples, the server device(s) 114, 124 may include all or some components of the computing architecture 200 as different virtual servers.

The worker component 212 may include the flow table 116 and a mitigation component 214. The worker component 212 includes functionality to perform data-plane tasks. In various examples, the worker component 212 may process and/or forward incoming packets through the fast-path. The fast-path processing can be implemented with customized integrated circuit including application-specific integrated circuit (ASIC), field-programmable gate array (FPGA), or co-processor, or another CPU.

In some examples, the worker component 212 may forward packets to mapping servers based on traffic direction. For inside to outside traffic, the worker component 212 may hash the source address to ensure all flows from the same client host device to go to the same mapping server and have the same external address. For outside to inside traffic, the worker component 212 may use the flow table 116 to look-up the VMS owning the destination address and port.

As discussed herein, the flow table 116 may store rules populated by the mapping servers when sending state responses for controlling and directing the packet flows in the network. The flow table 116 may include a cache of NAT mappings. As described herein, a packet flowing from an internal host to outside always goes to the same virtual mapping serving (VMS) for source address hashing in order to always have the same external address, thus the flow table 116 stores mapping server lookup tables and/or state tables to maintain the correct flow. A packet coming from outside to inside may have a destination address combined with a pool-based address. The pool-based address is assigned by the controller component 126 to a particular VMS.

The mitigation component 214 may implement failover solution for dynamic NAT by generating and assigning an outbound address/port to new IP sessions and sharing the generated information with other servers. The worker component 212 serving as fast-path NAT servers may use dynamically allocated routable address/port pairs assigned to new sessions. As discussed in the flow table 116, the routable addresses are mapped to unrouteable addresses and the NAT worker translates, in both directions, one to the other. However, the dynamic nature of this kind of NAT means that the external port and address used for a session cannot be predicted from a second location. This is problematic for redundancy due to the inability to failover a session from one place to another without this information in the second location. To mitigate this problem, when a new session starts, the mitigation component 214 may assign an outbound address/port and share this outbound information with one or more other servers. In the event that there is a failure of any type and traffic must be forwarded to the one or more other servers, the outbound information is on hand and available. The mitigation component 214 may share this outbound information based on one or more mitigation schemes.

In various examples, the mitigation component 214 may include a mitigation scheme having a central server that could issue new outbound address/port pairs. The packet could be dropped or held until the binding is known. If a second server received a packet this would also go to the central server and find the existing pairing there. In some examples, the mitigation component 214 may include a mitigation scheme having UDP broadcast or multicast, or L2 broadcast or multicast, that could be used to forward the session information as soon as it is decided to the other nodes. Separately or in conjunction, an eventually consistent DB system could be used. In an alternative example, the mitigation component 214 may determine that sharing the outbound information need not be across all servers but rather techniques could be used to ensure that the backup information is likely to be on the backup server for the flow in question. Thus, this requires unicast and not broadcast. In an additional example, the mitigation component 214 may use the equal-cost multi-path routing (ECMP) to re-steer ECMP outbound traffic to the failed server to other servers while keeping the hashing as is.

The processing component 118 may implement functionality to process and forward packets. In some examples, the NAT worker may find the mapping for a packet in the flow table 116, and the processing component 118 may perform state network address translation and forward the packet according to the translation. In additional examples, the NAT worker may not have the mapping for the packet and may send a state request to the mapping servers. Thereafter, the processing component 118 may perform state network address translation and forward the packet according to the translation.

The controller component 126 may implement functionality to control and direct traffic flow in the network. In some examples, the controller component 126 may determine the number of the physical servers and configure a number of virtual mapping servers (VMSs) that is greater than the number of physical servers. The controller component 126 may assign a pool of public addresses and ports to each VMS. The VMSs are added and removed as public address space is added and removed. The pools assigned to the VMSs do not overlap each other. As described herein, the controller component 126 may create a VMS and associated the new VMS with a first physical primary server and copy the VMS image to a second physical failover server. The controller component 126 may associate the physical servers based on a fair load sharing computation.

In various examples, the controller component 126 may perform re-computations and/or start the synchronization process based on a physical server addition or a server failure. As described herein, the controller component 126 may be informed of the server failure by the NAT worker through the state request and/or Bidirectional Forwarding Detection (BFD) protocol keepalive message from the failed server. The keepalive is a message sent by one device to another to check that the link between the two is operating. In response to the server failure, the controller component 126 may remap the VMSs to available servers. The VMSs running on failed primary servers are replaced with their backup VMSs on failover servers. Failed failover servers are replaced with new failovers. The new mapping table is pushed to all NAT workers and mapping servers. When necessary, the controller component 126 may start a full table synchronization process.

The state component 216 may implement functionality to receive state requests and respond accordingly. The state component 2016 may generate a state table to track the state and/or flow of a communication session. The state component 216 may receive a state request from a NAT worker.

Based on the state request, the state component 216 may perform a state lookup, or may trigger mapping creation. In various examples, the state component 216 may send a state reply back by the NAT worker. In some examples, the state component 216 may also receive a packet with the state request. The state component 216 may determine to process and forward the packet or return the packet to the NAT worker with the state reply. While the NAT worker or active mapping server may handle traffic requiring translation of IP address information, the state component 216 may inform the backup mapping servers of active flow as they occur. The state component 216 may use information from the active flow to prepare duplicate translation table entries by performing "state duplication."

The virtual mapping server (VMS) component 218 may include primary VMS(s) 220 and failover VMS(s) 222. The controller component 126 may interact with virtual mapping server (VMS) component 218 to configure a number of VMSs that is greater than the number of physical servers. The VMS component 218 may create new VMS images and the controller component 126 may associated the new VMS with a first physical primary server and copy the VMS image to a second physical failover server. The computing architecture 200 may include one or more processors 202 configured to execute the primary VMS(s) 220 described herein. If a physical server failure is detected, controller component 126 may execute the failover VMS(s) 222 to handle state requests that should have gone to the failed server and the failover VMS(s) 222 may start behaving as a primary server.

The distributed NAT system 102 may include a data store 224 that is stored on a server device(s) 114, 124 of the distributed NAT system 102, or across multiple server device(s) 114, 124 of the distributed NAT system 102. The data store 224 may include a file store that includes one or more images may comprise static files that include executable code to run an isolated process, such as mapping server image, virtual machine image, mapping table image, etc. The images may comprise system libraries, system tools, and other platform settings a software program needs to run on a virtualized platform.

The data store 224 may further store physical cluster data, such as the number of physical servers and identifiers, the individual server data, the mapping table, and resource-availability data. The individual server data may comprise various types of data indicating locations of the cluster nodes. The resource-availability data may indicate amounts of different types of computing resources (e.g., compute, storage, database, network, etc.) available on each of the cluster nodes. In some instances, the resource-availability data may be considered when determining which physical servers that the primary and failover virtual mapping servers are to be associated with to ensure fair load sharing.

Figure 3:
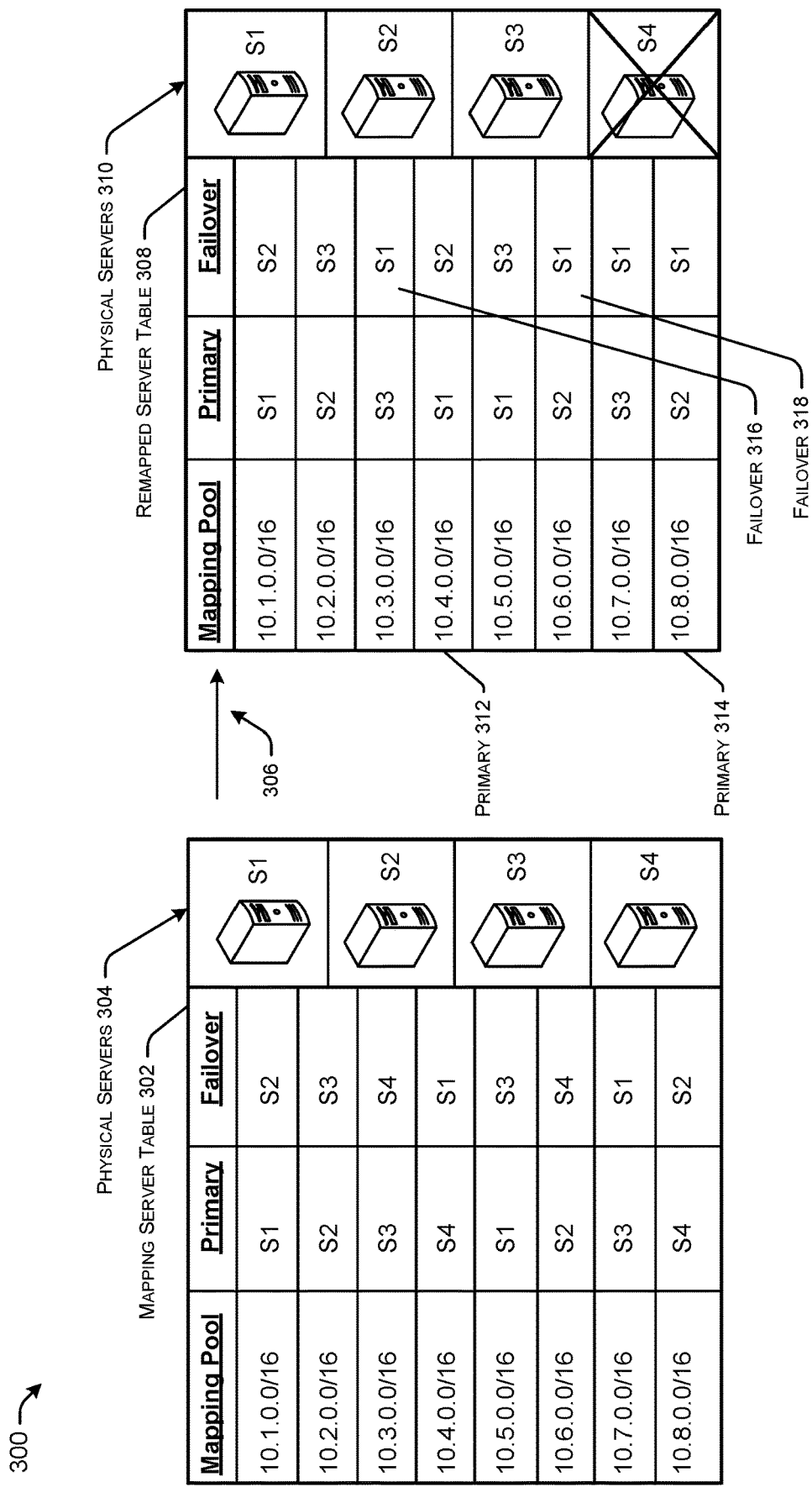
FIG. 3 is a schematic diagram showing example mapping tables for virtual mapping server (VMS) lookup for a distributed network address translation (NAT) and remapped VMS based on a physical server failure.

FIG. 3 is a schematic diagram showing example mapping tables 300 for virtual mapping server (VMS) lookup for a distributed network address translation (NAT) and remapped VMS based on a physical server failure. The example mapping tables 300 is a non-limiting example how the distributed NAT system may remap VMSs from a first set of available physical servers 304 to a second set of available physical servers 310 following a server failure event 306. The example mapping tables 300 may include the example mapping server table 302 and the example remapped server table 308.

In the example mapping server table 302, the controller component 126 may determine the number of the physical servers in the first set of available physical servers 304 and configure a number of virtual mapping servers (VMSs) that is greater than the number of physical servers. The controller component 126 may assign a pool of public address and port to each VMS. As illustrated, the controller component 126 may associate each VMS with a first physical primary server and a second physical failover server. The controller component 126 may associate the physical servers based on a fair load sharing computation. As illustrated in the example mapping server table 302, each server of the physical servers 304 (e.g., S1, S2, S3, and S4) serves as a primary server for two VMSs and failover server for two VMSs. Additionally, the primary and failover servers for each VMS are different.

In response to the server failure event 306, the controller component 126 may remap the VMSs to the second set of available physical servers 310 (e.g., S1, S2, and S3). In the example remapped server table 308, the controller component 126 may determine that a server has failed and the VMSs running on the example failed primary servers 312 and 314 needs to be replaced with their backup VMSs on failover servers. The example failed failover servers 316 and 318 are replaced with new failovers.

As a non-limiting example, in the server failure event 306, the physical server "S4" has failed. As illustrated in the example remapped server table 308, the two VMSs that had server "S4" as the primary server has been replaced with the VMSs on failover servers. For instance, the example failed primary server 312 has replaced "S4" with its former failover "S1," while the example failed primary server 314 has replaced "S4" with its former failover "S2." Additionally, the example failed failover servers 316 and 318 has replaced "S4" with a new failover "S1."

Figure 4:
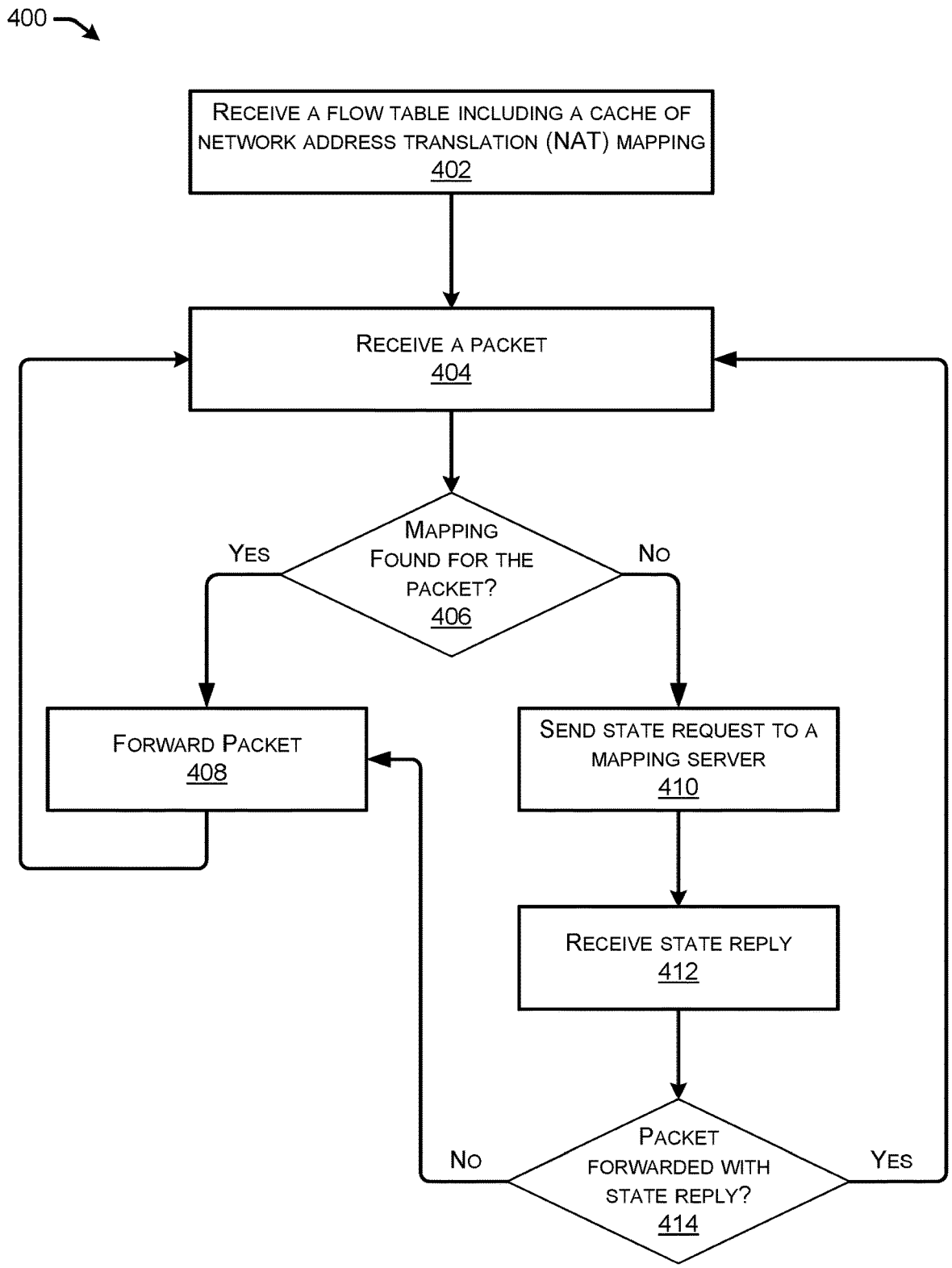
FIG. 4 illustrates a flow diagram of an example method for a distributed NAT processing an IP packet using fast-path and slow-path architecture.
Figure 5:
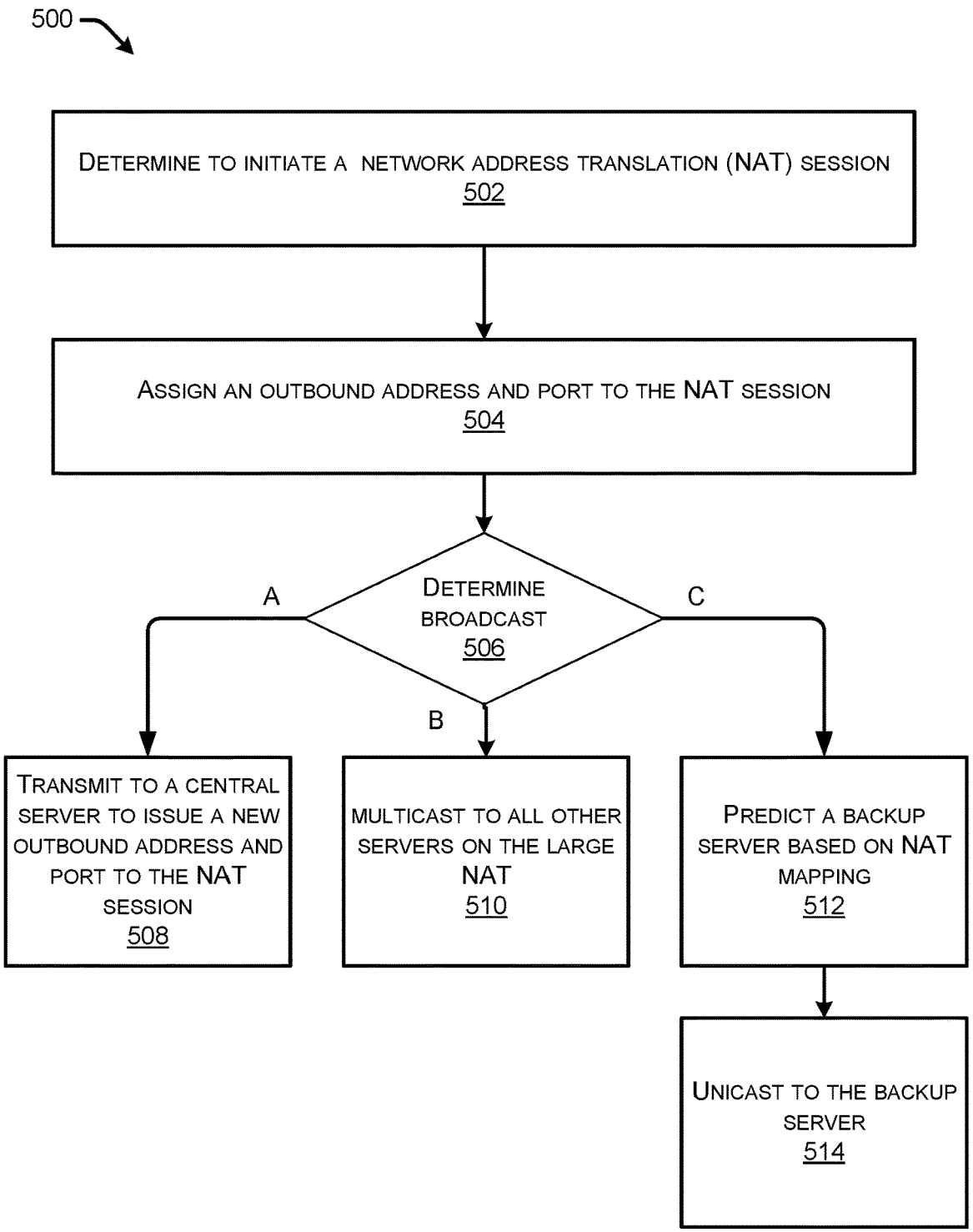
FIG. 5 illustrates a flow diagram of an example method for providing mitigations for flow breakage during failover events on a distributed NAT system.
Figure 6:
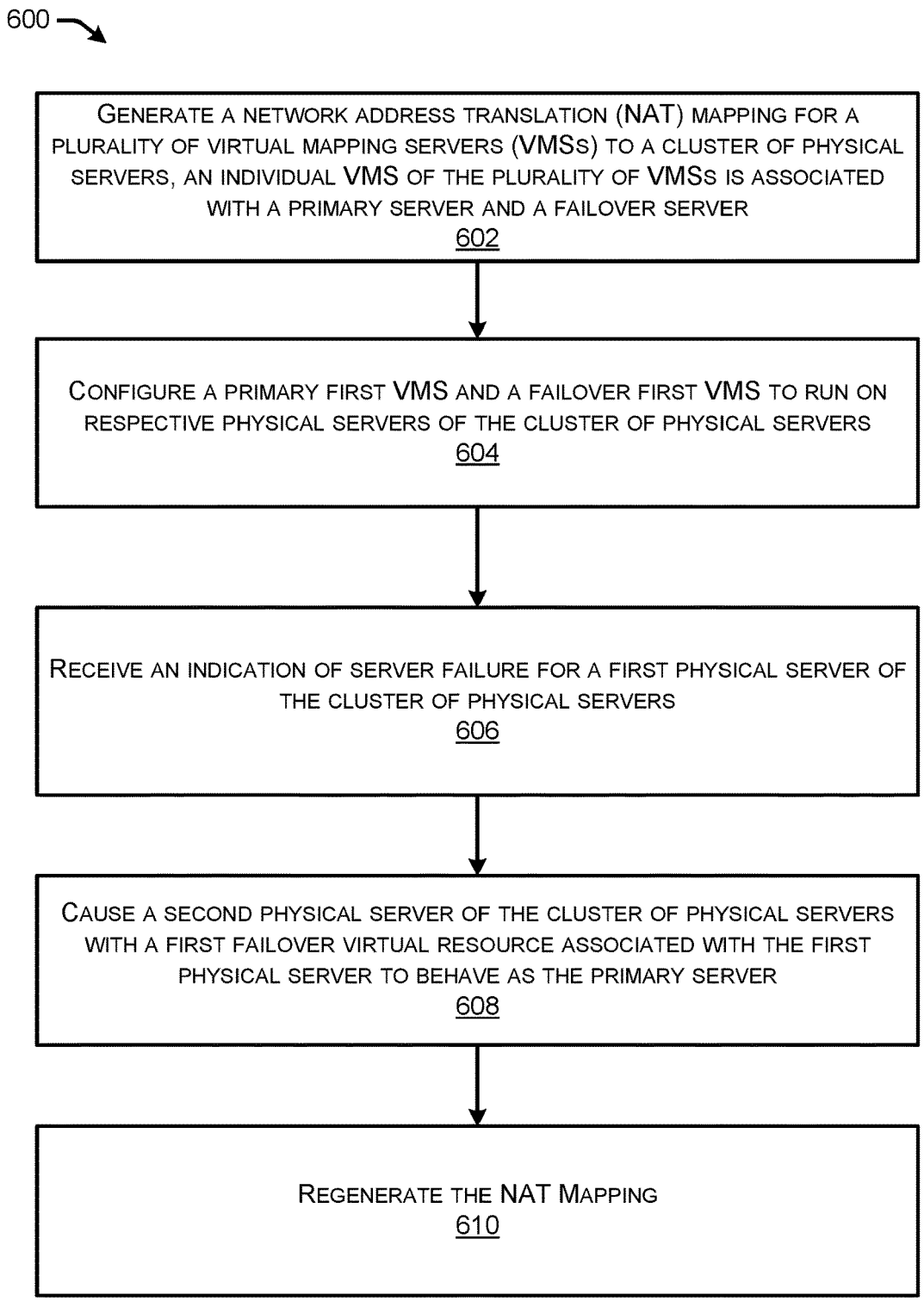
FIG. 6 illustrates a flow diagram of an example method for configuring a highly available distributed NAT with mitigation for a server failure.

FIGS. 4, 5, and 6 illustrate flow diagrams of example methods 400, 500, and 600 that illustrate aspects of the functions performed at least partly by the distributed NAT system 102 as described in FIGS. 1-3. The logical operations described herein with respect to FIGS. 4, 5, and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4, 5, and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for a distributed NAT processing packets using fast-path and slow-path architecture running on a server device(s) 114, 124. The method 400 is described with reference to the distributed NAT system 102 and may be performed by the server device(s) 114, 124 and/or in cooperation with any one or more of the host device(s) 108, the routing device 110, or the external device(s) 112. Of course, the method 400 may be performed in other similar and/or different environments.

At 402, the NAT component 210 may receive a flow table including a cache of network address translation (NAT) mapping. The NAT component 210 may include the worker component 212 receiving the flow table 116. The worker component 212 includes functionality to perform data-plane tasks. In various examples, the worker component 212 may process incoming packets through the fast-path. The fast-path processing can be implemented with customized integrated circuit including application-specific integrated circuit (ASIC), field-programmable gate array (FPGA), or co-processor, or another CPU. The flow table 116 may store rules populated by the mapping servers when sending state responses for controlling and directing the packet flows in the network. The flow table 116 may include a cache of NAT mappings.

At 404, the NAT component 210 may receive a packet. The NAT component 210 may use the flow table 116 to direct the packet flows in the network. In various examples, the NAT component 210 may include NAT workers to forward packets to mapping servers based on traffic direction. For inside to outside traffic, the NAT workers may hash the source address to ensure all flows from the same client host device to go to the same mapping server and have the same external address. For outside to inside traffic, the NAT workers may look-up the VMS owning the destination address and port. For instance, the packet flowing from an internal host to outside always goes to the same virtual mapping serving (VMS) for source address hashing in order to always have the same external address. The flow table 116 stores mapping server lookup tables and/or state tables to maintain the correct flow. A packet coming from outside to inside may have a destination address combined with a pool-based address.

At 406, the NAT component 210 may determine whether it has the mapping in the cache of NAT mapping for the packet. The NAT component 210 may determine whether a mapping for the packet in the flow table 116. If the mapping is found for the packet, go to method 408, otherwise go to method 410.

At 408, the NAT component 210 may forward the packet. The NAT component 210 may find the mapping for a packet either from the flow table 116 or state reply. The processing component 118 may perform state network address translation and forward the packet according to the translation. After the packet has been forwarded, the method may return to method 404 to await a new packet to process.

At 410, the NAT component 210 may send a state request to a mapping server. The NAT component 210 may include a NAT worker that determines that the mapping for the packet cannot be found and send a state request to a mapping server. The NAT worker receiving a packet may locally cache the packet and may or may not send the packet with a state-request to the mapping server. If the packet is not sent with the state-request, the meta-data associated with the packet may be sent with the request. This allows the NAT worker to forward the cached packet even if it is not returned with the state-reply. The NAT component 210 may dynamically determine to cache and/or forward packets with in state-request based on the available space to cache packets. The mapping server may include a state component 216 to receive state requests and respond accordingly. The state component 216 may receive a state request from the NAT worker. Based on the state request, the state component 216 may perform a state lookup, or may trigger mapping creation. In various examples, the state component 216 may send a state reply back to the NAT worker. In some examples, the state component 216 may also receive a packet with the state request. The state component 216 may determine to process and forward the packet or return the packet to the NAT worker with the state reply. While the NAT worker or active mapping server may handle traffic requiring translation of IP address information, the state component 216 may inform the backup mapping servers of active flow as they occur. The state component 216 may use information from the active flow to prepare duplicate translation table entries by performing "state duplication."

At 412, the NAT component 210 may receive a state reply. The NAT component 210 may include a NAT worker that sends a state request to a mapping server. The mapping server may include a state component 216 to receive state requests and respond accordingly. Based on the state request, the state component 216 may perform a state lookup, or may trigger mapping creation. The state component 216 may send a state reply back to the NAT worker.

At 414, the NAT component 210 may determine whether the packet was forwarded with the state reply. The NAT component 210 may include a NAT worker that determines that the mapping for the packet cannot be found and send a state request. The state component 216 may receive a state request from the NAT worker. In some examples, the state component 216 may also receive a packet with the state request. The state component 216 may determine to process and forward the packet, and the method returns to method 404 to wait for a new packet. Otherwise, the method returns to method 408 and the NAT worker forwards the packet.

FIG. 5 illustrates a flow diagram of an example method 500 for providing mitigations for flow breakage during failover events on a distributed NAT system 102. The method 500 is described with reference to the distributed NAT system 102 and may be performed by the server device(s) 114, 124 and/or in cooperation with any one or more of the host device(s) 108, the routing device 110, or the external device(s) 112. Of course, the method 500 may be performed in other similar and/or different environments.

At 502, the NAT component 210 may determine to initiate a network address translation (NAT) session. A user of the distributed NAT system 102 may interact via the host device(s) 108 to initiate an active communication session. In response, the NAT component 210 may determine to initiate a network address translation (NAT) session.

At 504, the system may assign an outbound address and port to the NAT session. The NAT component 210 may include a mitigation component 214 that may implement failover solution for dynamic NAT by generating and assigning an outbound address/port to new IP sessions and sharing the generated information with other servers. When a new session starts, the mitigation component 214 may assign an outbound address/port and share this outbound information with one or more other servers. In the event that there is a failure of any type and traffic must be forwarded to the one or more other servers, the outbound information is on hand and available.

At 506, the system may determine a mitigation broadcast scheme to use. The mitigation component 214 may share the outbound information from method 504 based on one or more mitigation schemes as described herein in method 508, 510, and 512.

At 508, the system may transmit to a central server to issue a new outbound address and port to the NAT session. The mitigation component 214 may include a mitigation scheme having a central server that could issue new outbound address/port pairs. The packet could be dropped or held until the binding is known. If a second server received a packet this would also go to the central server and find the existing pairing there.

At 510, the system may multicast to all other servers on the large NAT. The mitigation component 214 may include a mitigation scheme having UDP broadcast or multicast, or L2 broadcast or multicast, that could be used to forward the session information as soon as it is decided to the other nodes. Separately or in conjunction, an eventually consistent DB system could be used.

At 512, the system may predict a backup server based on NAT mapping. The mitigation component 214 may determine that sharing the outbound information need not be across all servers but rather techniques could be used to ensure that the backup information is likely to be on the backup server for the flow in question. Thus, this requires unicast and not broadcast.

At 514, the system may unicast to the backup server. The mitigation component 214 may unicast to the backup server determined from method 512.

FIG. 6 illustrates a flow diagram of an example method 600 for configuring a highly available distributed NAT with mitigation for a server failure. The method 600 is described with reference to the distributed NAT system 102 and may be performed by the server device(s) 114, 124 and/or in cooperation with any one or more of the host device(s) 108, the routing device 110, or the external device(s) 112. Of course, the method 600 may be performed in other similar and/or different environments.

At 602, the system may generate a network address translation (NAT) mapping for a plurality of virtual mapping servers (VMSs) to a cluster of physical servers, an individual VMS of the plurality of VMSs is associated with a primary server and a failover server. The controller component 126 may determine the number of the physical servers available in the system and configure a number of virtual mapping servers (VMSs) that is greater than the number of physical servers. The controller component 126 may assign a pool of public address and port to each VMS. The controller component 126 may create a VMS and associated the new VMS with a first physical primary server and copy the VMS image to a second physical failover server. The controller component 126 may associate the physical servers based on a fair load sharing computation.

At 604, the system may configure a primary first VMS and a failover first VMS to run on respective physical servers of the cluster of physical servers. The system may create a VMS and associated the new VMS with a first physical primary server and copy the VMS image to a second physical failover server. The distributed NAT system 102 may function as a stateful network address translation (SNAT) system that allows two or more VMSs to function as a translation group. One member of the translation group handles traffic requiring translation of IP address information. Additionally, it informs the "failover" backup VMS of active flow as they occur. The "failover" backup VMS can then use information from the active "primary" VMS to prepare duplicate translation table entries by "state duplication."

At 606, the system may receive an indication of server failure for a first physical server of the cluster of physical servers. The system may be informed of the server failure by a NAT worker through the state request and/or Bidirectional Forwarding Detection (BFD) protocol keepalive message from the failed server. The keepalive is a message sent by one device to another to check that the link between the two is operating.

At 608, the system may cause a second physical server of the cluster of physical servers with a first failover virtual resource associated with the first physical server to behave as the primary server. If the active "primary" VMS is hindered by a critical failure of the physical server, the traffic can rapidly be switched to the "failover" backup VMS. The traffic flow continues since the same network address translations are used and the state of those translations has been previously defined. That is, in response to a server failure, the controller component 126 may remap the VMSs to available servers. The VMSs running on failed primary servers are replaced with their backup VMSs on failover servers. Failed failover servers are replaced with new failovers.

At 610, the system may regenerate the NAT Mapping. The controller component 126 may perform re-computations and/or start the synchronization process based on a physical server addition or a server failure. The new mapping table is pushed to all NAT workers and mapping servers. When necessary, the controller component 126 may start a full table synchronization process.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more non-transitory computer-readable media storing computer-executable instructions that, when executed by the one or more processors, cause the one or more processors to:
   receive, from a mapping server, a flow table including a cache of network address translation (NAT) mapping, the flow table includes rules to direct IP traffic;
   receive, from a host device, an internet protocol (IP) packet;
   determine that a mapping information for the IP packet is not included in the cache of NAT mapping;
   send, to the mapping server, a state request to determine the mapping information for the IP packet, wherein the sending the state request includes sending metadata associated with the IP packet to the mapping server and caching the IP packet;
   receive, from the mapping server, a state reply including the mapping information for the IP packet and an updated cache of NAT mapping; and
   determine to forward the IP packet using the updated cache of NAT mapping.

2. The system of claim 1, wherein the sending the state request includes sending the IP packet to the mapping server, and wherein the receiving the state reply does not include receiving the IP packet.

3. The system of claim 1, wherein the sending the state request includes sending the IP packet to the mapping server, wherein the receiving the state reply includes receiving the IP packet.

4. A method comprising:
receiving, from a mapping server, a flow table including a cache of network address translation (NAT) mapping;
receiving, from a host device, an internet protocol (IP) packet;
determining that a mapping information for the IP packet could not be located based at least in part on the flow table;
sending, to the mapping server, a state request;
receiving, from the mapping server, a state reply;
determining, from a first NAT server on a distributed NAT, to initiate a NAT session based at least in part on the IP packet;
assigning an outbound address and port information to the NAT session; and
broadcasting, to a second NAT server on the distributed NAT, the outbound address and port information.

5. The method of claim 4, wherein the determining that the mapping information for the IP packet could not be located further comprises:
determining a source address from the IP packet; and
performing hash algorithm on the source address.

6. The method of claim 4, further comprising:
receiving, from an external device, a second IP packet;
determining a destination address and port from the second IP packet;
determining that the destination address and port is included in the cache of NAT mapping; and
determining to forward the second IP packet using the destination address and port.

7. The method of claim 4, further comprising:
determining a server failure on the first NAT server; and
retrieving, from the second NAT server, the outbound address and port information.

8. The method of claim 4, further comprising:
transmitting, to a central server on the distributed NAT, the IP packet to issue the outbound address and port information for NAT session.

9. The method of claim 8, further comprising:
determining a server failure of the first NAT server; and
retrieving, from the central server, the outbound address and port information.

10. The method of claim 4, further comprising:
broadcasting, to a plurality of NAT servers on the distributed NAT, the outbound address and port information.

11. The method of claim 4, further comprising:
sending, to the mapping server, a second state request;
determine the mapping server has failed based at least in part on not receiving a second state reply within a threshold time; and
sending, to a controller server, a third state request based at least in part on determining the mapping server has failed.

12. One or more non-transitory computer readable media storing computer-executable instructions that, when executed, cause one or more processors to perform operations comprising:
receiving, from a mapping server, a flow table including a cache of network address translation (NAT) mapping;
receiving, from a host device, an internet protocol (IP) packet;
determining that a mapping information for the IP packet could not be located based at least in part on the flow table;
sending, to the mapping server, a state request;
receiving, from the mapping server, a state reply;
determining, from a first NAT server on a distributed NAT, to initiate a NAT session based at least in part on the IP packet; and
transmitting, to a central server on the distributed NAT, the IP packet to issue an outbound address and port information for NAT session.

13. The one or more non-transitory computer readable media of claim 12, wherein the determining that the mapping information for the IP packet could not be located further comprises:
determining a source address from the IP packet; and
performing hash algorithm on the source address.

14. The one or more non-transitory computer readable media of claim 12, the operations further comprising:
receiving, from an external device, a second IP packet;
determining a destination address and port from the second IP packet;
determining that the destination address and port is included in the cache of NAT mapping; and
determining to forward the second IP packet using the destination address and port.

15. The one or more non-transitory computer readable media of claim 12, further comprising:
assigning the outbound address and port information to the NAT session; and
broadcasting, to a second NAT server on the distributed NAT, the outbound address and port information.

16. The one or more non-transitory computer readable media of claim 15, further comprising:
determining a server failure on the first NAT server; and
retrieving, from the second NAT server, the outbound address and the port information.

* * * * *